(12) United States Patent
Schmidt et al.

(10) Patent No.: US 12,369,081 B2
(45) Date of Patent: Jul. 22, 2025

(54) INTEGRATED ACCESS AND BACKHAUL MOBILITY

(71) Applicant: IPCom GmbH & Co. KG, Pullach (DE)

(72) Inventors: Andreas Schmidt, Braunschweig (DE); Martin Hans Hans, Bad Salzdetfurth (DE)

(73) Assignee: IPCom GmbH & Co. KG, Pullach (DE)

( * ) Notice: Subject to any disclaimer, the term of this patent is extended or adjusted under 35 U.S.C. 154(b) by 0 days.

(21) Appl. No.: 18/502,122

(22) Filed: Nov. 6, 2023

(65) Prior Publication Data

US 2024/0073751 A1    Feb. 29, 2024

Related U.S. Application Data

(63) Continuation of application No. 17/663,835, filed on May 18, 2022, now Pat. No. 11,849,357, which is a continuation of application No. 15/733,932, filed as application No. PCT/EP2019/063793 on May 28, 2019, now Pat. No. 11,490,295.

(51) Int. Cl.
*H04W 36/00* (2009.01)
*H04W 36/36* (2009.01)
(Continued)

(52) U.S. Cl.
CPC ... *H04W 36/0061* (2013.01); *H04W 36/0085* (2018.08); *H04W 36/362* (2023.05);
(Continued)

(58) Field of Classification Search
None
See application file for complete search history.

(56) References Cited

U.S. PATENT DOCUMENTS

2014/0045494 A1* 2/2014 Pekonen ........... H04W 36/0061
455/437
2014/0335869 A1* 11/2014 Choi ............... H04W 36/00695
455/438

(Continued)

OTHER PUBLICATIONS

Huawei, QoS Management of IAB nodes, 3GPP R3-183187, Agenda Item: 24.1.4, 3GPP TSG-RAN WG3#100, Busan, Korea, May 11, 2018.

(Continued)

*Primary Examiner* — Charles N Appiah
*Assistant Examiner* — Frank E Donado
(74) *Attorney, Agent, or Firm* — Proi Intellectual Property US

(57) ABSTRACT

The present invention provides a mobile communication system sub-network comprising a macrocell base station, and a plurality of small cell base stations, the plurality of small cell base stations being in wireless communication with the macrocell base station, wherein each small cell base station is either in direct connection with the macrocell base station or is in connection with the macrocell base station via one or more other small cell base stations, wherein the macrocell base station is arranged to configure a UE device having a RRC connection to the macrocell base station with candidate small cell base station information for enabling the UE device to switch autonomously between small cell base stations, and wherein the macrocell base station is arranged to configure the small cell base stations with small cell base station configuration information.

11 Claims, 7 Drawing Sheets

(51) Int. Cl.
 *H04W 84/04* (2009.01)
 *H04W 36/08* (2009.01)
 *H04W 36/30* (2009.01)
(52) U.S. Cl.
 CPC .... *H04W 84/045* (2013.01); *H04W 36/00837* (2018.08); *H04W 36/08* (2013.01); *H04W 36/302* (2023.05)

(56) References Cited

U.S. PATENT DOCUMENTS

| | | | | |
|---|---|---|---|---|
| 2015/0282159 | A1* | 10/2015 | Vrind | H04W 76/10 455/450 |
| 2016/0165491 | A1* | 6/2016 | Liu | H04W 12/04 370/331 |
| 2017/0238222 | A1* | 8/2017 | Jiang | H04W 36/0061 370/331 |
| 2017/0311217 | A1* | 10/2017 | Jung | H04W 36/023 |

OTHER PUBLICATIONS

Huawei, CP protocol design for L2 relaying, 3GPP R3-183183, Agenda Item: 24.1.2, 3GPP TSG-RAN WG3 #100, Busan, Korea, May 11, 2018 Name of the author, title of the article, title of the item, publisher, city and or country where published.

Intel Corporation, Adaptation layer and Routing for IAB in NR, 3GPP R3-183169, Agenda item: 24.1.2, 3GPP TSG RAN WG3 Meeting #100, Busan, Korea, May 11, 2018.

* cited by examiner

Control Plane (Access Link)

User Plane (Access Link)

Control Plane (Backhaul Link)

INTEGRATED ACCESS AND BACKHAUL MOBILITY

The present invention relates to a method of operating a mobile communication network in which user equipment, UE, devices can switch between communication cells.

Known cellular mobile communication networks comprise a core network (CN) and one or more radio access networks (RANs). The CN comprises amongst others functions for authentication and authorization of users and devices, for quality of service (QoS) management and control, for providing access to various data networks and for data routing between the RANs and data networks. The CN is typically radio access technology (RAT) agnostic, i.e. it comprises only functions that do not relate to a specific RAT or RAN.

Each RAN comprises functions that provide to user equipment (UE) devices wireless radio access to the core network. Some of these functions are specific for the used RAT, e.g. UMTS, LTE or 5G new radio (NR). A RAN consists of multiple macro base stations of a specific RAT (NB, eNB, gNB) and it may additionally comprise a number of small cell base stations (SCs) of the same or a different RAT.

UE devices that are registered in the CN may have a current connection to a RAN and the CN, i.e. they are in connected mode, or they do not have such a connection, i.e. they are in idle or inactive mode. For UE devices in connected mode, there is typically one base station controlling the device, called serving base station or serving cell throughout this document. This serving base station is using the radio resource control (RRC) protocol to establish an RRC context in both, the UE and the base station. The RRC context comprises the UE device's radio capabilities, the current setup of bearers with respective QoS, the multiplexing of services or applications on these bearers and the multiplexing of these bearers onto physical resources, the allocated usable resources and measurements to be performed by the UE device and triggers and content for the reporting of such measurements. The measurement configuration comprises neighbour cells to be measured, which neighbour cells may operate on the same RAT and same frequency as the controlling base station, same RAT and different frequency or different RATs.

When measurement reports received in the serving base station indicate neighbour cells to be more appropriate for communication than the serving cell, the base station may execute a handover procedure in which it prepares a selected target cell for the handover and commands the UE to handover to the target cell. During preparation, the target cell receives the RRC context from the serving cell so that the communication between UE and target cell can continue basically from the state it had in the serving cell.

US 2011/0143738 A1 describes autonomous search functions (ASFs) that are functions that modify their own functionality in response to external inputs, optimizing search strategy to the environment. Mobile devices use ASFs on an LTE network to scan a range of frequencies to find information broadcast by cells. Information broadcast by UTRA and E-UTRA cells may include the cell's closed subscriber group (CSG) ID, information specifying supported protocols, information specifying supported radio access technology (RAT), and the rating of the cell within its frequency, as well as other information identifying the cell and how to connect to it. The mobile device may use information about detected cells to initiate proximity detection messages for call handover or handover avoidance. When a mobile device enters or leaves the proximity of another cell while connected to a UTRA or E-UTRA base station, the network may initiate handover messages between the mobile device's current base station and the detected cell's base station.

U.S. Pat. No. 9,717,110 provides methods for wireless communication between a first and second wireless communication devices, the first device sending a chirp signal to the second devices in a mesh network during a first wake-up period common to the first and second devices. The first device further receives a keep alive signal and connection setup information from a determined wireless relay device from among the second devices during the first wake-up period, the connection setup information comprising resource allocation information. Further a downlink page may be transmitted to the first device together with the connection setup information.

US 2017/0055192 A1 describes a UE centric mobility mechanism in which a UE performs cell-reselection during RRC connected mode, when extended DRX is used, i.e. when the UE does not receive data for a longer period of time. The reselection criteria are received from a source cell in RRC connected mode and the UE decides about whether network-controlled mobility or UE autonomous cell re-selection is applied based on conditions, e.g. whether extended DRX is used. When using UE autonomous re-selection and signaling is required in a target cell, a RRC reestablishment procedure is used by the UE to establish a connection to the target cell. As a result the target cell fetches the UE context from the source cell, similar to an RRC connection establishment or resumption from idle mode.

EP 2 879 440 A1 describes a technique for controlling a small cell base station in a system comprising small cell base stations controlled by a macrocell base station. The small cells take measurements and information is reported to the macrocell base station.

WO 2017/028808 A1 discusses a method of connected mode cell reselection in which a UE can perform cell reselection without handover signaling. EP 3 125 640 A1 describes a bearer management procedure where the UE has dual connectivity, changing a bearer type between a master cell group and a secondary cell group. WO 2015/065010 A1 describes a method for performing dual connectivity in a heterogeneous network comprising for example a macrocell base station and small cell base stations.

Wireless relays are known from LTE. They are base stations that connect wirelessly via so called donor base stations (DeNB) to the core network. Towards the UE devices served by the wireless relay, the relay looks like a normal base station that controls the UE device, i.e. an RRC connection is setup between the relay and the UE device. The wireless relay acts similar to a UE towards the DeNB, but the radio resources used between UE and relay are controlled by the DeNB or by the CN to a certain extent.

Dual or multi connectivity mechanisms are known from LTE and NR in which a single UE device has an RRC connection and an active radio connection to a serving cell, in that case called primary cell, and in addition it has one or more active radio connection to secondary cells. The primary cell controls the UE device and it also controls the secondary cells with regard to the UE device. The base station providing the secondary cell for a UE device may in parallel control other UE devices as a primary or serving cell. The addition and removal of secondary cells to the UE is completely under control of the primary cell.

For the migration of an LTE network towards new 5G NR techniques, dual connectivity is introduced with a UE device having a primary cell providing an LTE connection and secondary cells providing 5G NR connections, or vice-versa. In that case also the secondary cells have an RRC connection with the UE device of the respective secondary RAT, but the primary cell is still in control of the connections including addition and removal of secondary cells.

For a single UE device, the serving base station is typically the only or the main access point to the core network. That is, the exchange of control messages with the core network, so called NAS signaling, is routed through this base station to the core network. Also, the user data is routed via the serving cell, except for some dual connectivity scenarios in which multiple CN access points are used for user data routing. In case the CN needs to initiate signaling or data transfer towards the UE, it requests signaling or data transfer at the serving base station.

3GPP recently started studies of the usage of the 5G NR RAT for wireless backhaul links, typically used for small cells (SCs). The aim of the study is to allow a low cost and low effort SC deployment by connecting the SCs wirelessly to a controlling base station, so called donor next generation Node B, DgNB. The study includes multi-hop scenarios that connect a SC wirelessly to another SC until a final SC in the path offers a direct link to the DgNB.

A new multi-hop wireless RAN may use different architecture alternatives with respect to which node, i.e. which base station, has control of the multi-hop RAN and the UE devices connected to that RAN. Each solution has its benefits and drawbacks.

Similar to the known wireless relays of LTE, each base station (SC) in the multi-hop RAN may act as a full base station towards a served UE device or towards a served SC. For its backhaul link such a SC would then act similar to a UE device served by the next hop SC or the DgNB for the topmost SC layer. Drawbacks of this solution are that each handover of UEs between SCs would require a context transfer between SCs over the hierarchical multi-hop RAN. As security keys for encryption and integrity protection are setup between the serving base station and the UE device, the SCs would need to be built accordingly, i.e. located at a non-accessible place or secured with a housing that secures the security keys from being read out. This would increase the price for such SC significantly. Also, no single node has control of the multi-hop network, thus each SC would need knowledge about surrounding neighbour cells to properly configure measurements in the served UE devices. This would make an easy setup of such wireless SCs difficult and may require intervention of an operation and maintenance system necessary for each newly setup SC. Another drawback is that each SC in that architecture would be the serving RAN node of a UE for the CN, i.e. every handover of a UE between SCs would require an update of the respective CN node.

An alternative approach is the termination of each RRC connection in the DgNB, i.e. all UE devices as well as the SCs with a wireless backhaul via the multi-hop RAN would setup an RRC Connection with the DgNB, which in turn controls all devices within the multi-hop RAN. This would allow an easy setup of SCs, which are fully configured by the DgNB. As security in that case is setup between each device and the DgNB, security of served devices would not be an issue in any of the SCs and thus the price of the SC and its placement can be reduced.

However, the latter architecture alternative introduces latency to the connection between devices and their serving base station, now being the DgNB, which contradicts the requirement of some functions in a serving base station to be performed very quickly and resulting configurations reaching the served devices quickly. One example of such low delay procedures is the measurement reporting and resulting handover decisions.

The present invention overcomes the drawback of the DgNB-centric multi-hop RAN and makes that architecture the most beneficial solution for SC deployment.

The present invention provides a mobile communication system sub-network comprising a first, or macrocell, base station and a plurality of second, or small cell, base stations, the plurality of second base stations being in wireless communication with the first base station, wherein each second base station is either in direct connection with the first base station or is in connection with the first base station via one or more other second base stations, wherein the first base station is arranged to configure a user equipment, UE, device having a radio resource control, RRC, connection to the first base station with candidate second base station information for enabling the UE device to switch autonomously between second base stations, and wherein the first base station is arranged to configure the second base stations with second base station configuration information, the second base station configuration information enabling the second base stations to transmit data to and receive data from the UE device and to multiplex and route data from and to the UE device.

The invention further provides a corresponding UE device, small cell base station and method of operating a mobile communications network.

Preferred embodiments of the invention will now be described, by way of example only, with reference to the accompanying drawings in which.

Figure 1:
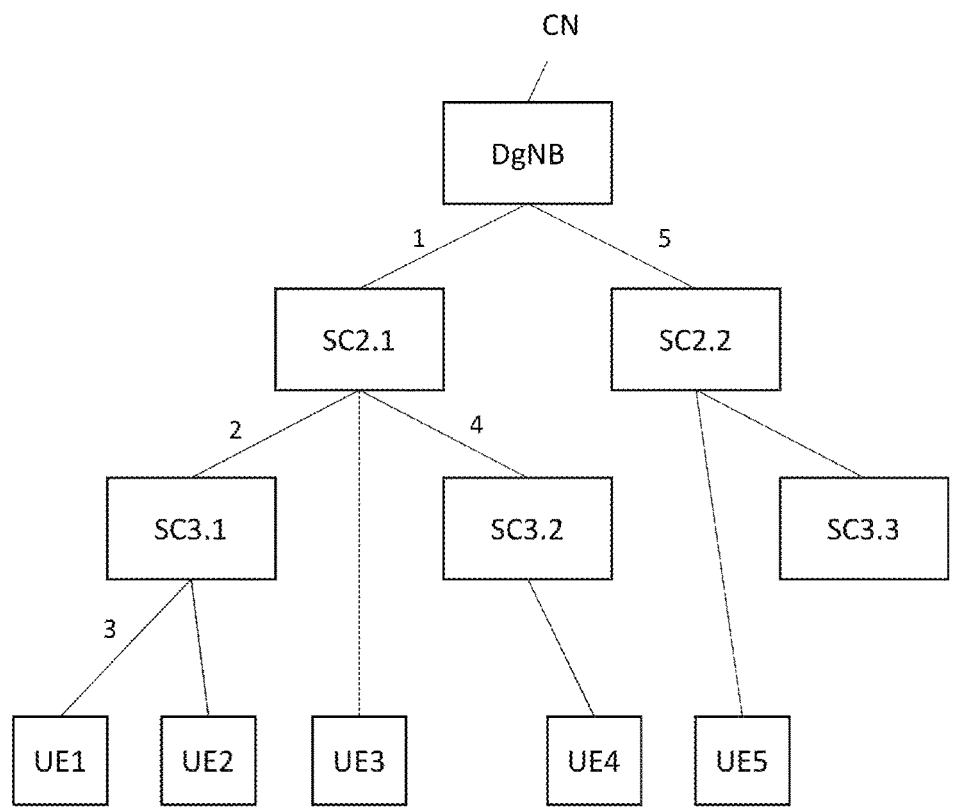
FIG. 1 shows a schematic arrangement of a multi-hop wireless backhaul network.

FIG. 1 shows an example multi-hop wireless backhaul RAN with a 5G new radio (NR) donor base station (DgNB) connected to a CN. The DgNB controls a subnetwork of multiple cascaded small cell base stations connected wirelessly. Each small cell base station has one wireless backhaul link to another small cell base station or to the DgNB and zero or more access links to other small cell base stations or to UE devices.

The DgNB has access links 1 and 5 to small cells SC2.1 and SC2.2, respectively.

The small cell base station SC2.1 has access links 2 and 4 to small cells SC3.1 and SC3.2, respectively. In addition, SC2.1 provides an access link to UE device UE3. The small cell SC2.2 has access links to small cell SC3.3 and to UE device UE5.

The small cell SC3.1 provides NR connectivity to two UE devices UE1 and UE2 and small cell SC3.2 provides NR connectivity to UE device UE4 via respective access links.

According to the present invention, all small cells and UE devices in the given example have an active connection to the RAN and via the RAN to the CN which may further provide connections to various data networks (not shown). UE devices UE1, UE2 and UE4 have established an RRC Connection to the DgNB via a first link, e.g. link 3, to a first small cell which is connected via a wireless backhaul link, e.g. link 2, to a second small cell. The second small cell is connected wirelessly, e.g. via link 1, to the DgNB. UE devices UE3 and UE5 have as well an RRC connection to the DgNB via a direct connection to small cells that are wirelessly connected to the DgNB.

All radio links in UL and DL have an inherent identification of the transmitting devices, i.e. a receiving base station in all legacy cellular radio communication systems can distinguish data received from different transmitting devices and the devices know from which base station they receive.

According to the current invention, all small cells of the example have an RRC connection to the DgNB, either via a direct wireless backhaul link or via a wireless backhaul to another small cell.

Small cell base stations in this new architecture are similar to layer 2 relays. They do not control the access of UE devices to the RAN or configure the device, both is done by the DgNB. They provide radio resources over an access link to served UE devices and to served small cells according to their configuration received from the DgNB. In downlink, they decode data received on the wireless backhaul link and reassemble segmented data packets and further they segment and encode the packets for forwarding on a wireless access link to the next small cell base station or to the UE device. In uplink, the small cell base stations decode data received on the access link and reassemble segmented data packets and further they segment and encode the packets for forwarding on a wireless backhaul link to the next small cell base station or to the DgNB.

In order to allow QoS to be provided throughout the described multi-hop network, different bearers from different UE devices need to be distinguished within every small cell. Only then the small cells can apply a bearer and UE device specific priority and resource allocation. As a result, on the air interfaces between two small cells or between a small cell and the DgNB an indication of the originating UE device and bearer is required for every data packet. That is, small cells need to be able to distinguish data packets from one bearer of a UE from another bearer of the same UE. As well, they need to be able to distinguish data packets from one bearer of a UE from a bearer of another UE.

The air interface, e.g. on a wireless backhaul link, provides inherently the information who is the originating device that transmitted the data in the UL, i.e. who is the peer device of a single hop. Also, the air interface provides a bearer identification for that hop, but on each further hop, the originating device as well as bearer information is lost.

According to this invention, a small cell multiplexes all data received from bearers of the previous hop that have similar or the same QoS, potentially from different originating devices, onto one bearer of the next hop with respective QoS. The so multiplexed data is transmitted over the air interface between two small cells. An indication of the originating bearer and device is injected or added to the data packets. This indication is used at the receiver to again decide about multiplexing of the data onto the next hop bearers. This enables each small cell base station to forward packets according to their individual QoS and priority.

Bearers are indicated on the legacy air interface, e.g. LTE, by indicating the logical channel identification (LogCh-ID) in the MAC header of a data packet. The LogCh-ID is, however, only unique within a single RRC Connection between a UE device and a serving base station. Other devices may use the same LogCh-ID to indicate their bearers. Base stations use the inherent UE device identification on the physical layer to uniquely identify the packet originator.

In this invention, for treatment of packets in a cascaded small cell base station network, an identification is required that combines the UE device identification and the bearer. The bearer in this sense is a term used for any data flows that have a common or similar QoS and priority. In legacy radio access networks this is usually termed bearer. The rest of this invention will use that term without losing generality. Similar to the (LogCh-ID), we call the indication of originating UEs and bearers jointly a global logical channel identity (GLogCh-ID) which is then used within the multi-hop network on each hop.

The GLogCh-ID is unique for every bearer of every UE device served within sub-network. The UE device may still be identifiable in the GLogCh-ID, e.g. if this identifier has two parts, a UE device identity unique for the UE device in the subnetwork and a LogCh-ID unique for a bearer of a single UE device, similar to the LogCh-ID used in today's protocol stack. Alternatively, the GLogCh-ID does not have separate identifiers for UE and bearer.

The DgNB is in control of the multiplexing. It configures all small cells with the GLogCh-ID and respective QoS and priorities of the devices for which they are configured to actually or potentially serve as a router or for providing an access link.

To simplify the description, in the following we focus our description on only a few nodes of those shown in FIG. 1: UE1, SC3.1, SC2.1, links 3, 2 and 1 and the DgNB.

Figure 2A:
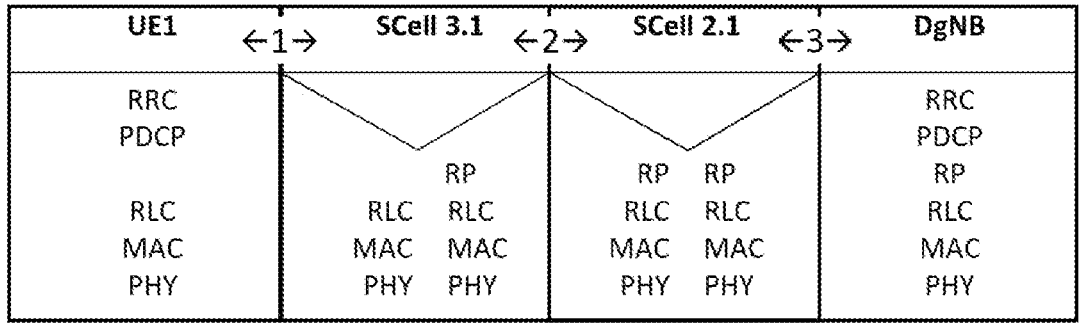
FIGS. 2a, 2b and 2c show protocol stack layers.
Figure 2B:
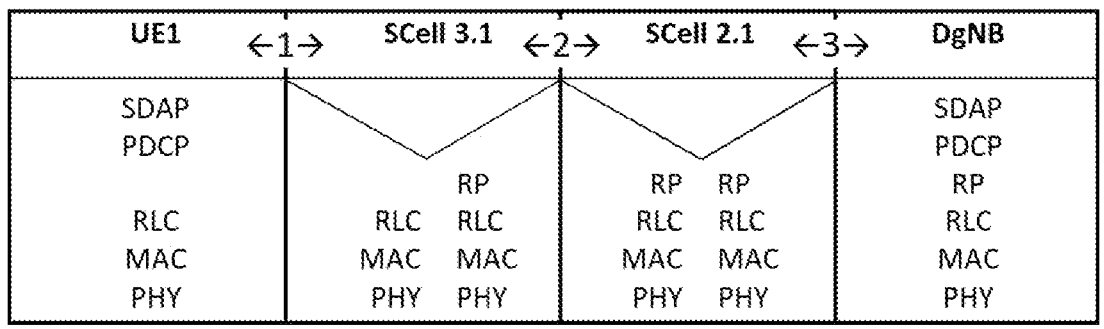
Figure 2C:
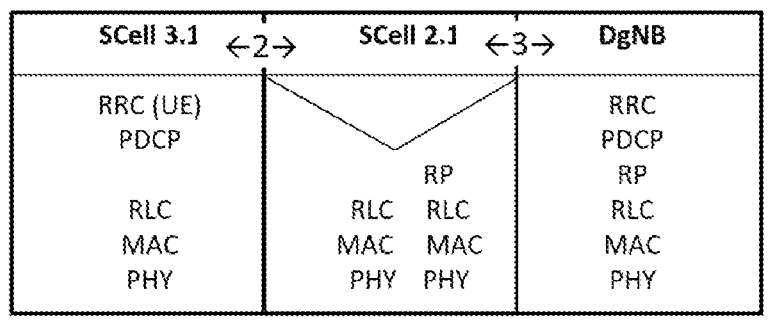

FIGS. 2a, 2b and 2c show the protocol stack layers as advantageously used in the involved nodes based on the currently envisaged protocol stack layers of the NR air interface.

FIG. 2a shows the protocol stack for the establishment and maintenance of the RRC connection between UE device UE1 and the DgNB (Control Plane) via small cells SC3.1 and SC2.1. An RRC connection is established between UE UE1 and the DgNB, so that the RRC protocol peers reside in the UE device and the DgNB. A security association is established as well between these two entities and the PDCP protocol layer is using the security association, i.e. the respective shared keys, to encrypt and integrity protect the RRC messages. The protocol layers below PDCP, i.e. radio link control protocol (RLC), medium access control (MAC) and the physical layer (PHY) are related to an actual radio link. They are therefore present in each involved node and each hop is established by the respective peer protocols on either side of the hop.

For each hop between network nodes, i.e. between two small cells or between a small cell and the DgNB, a function is required to multiplex the received packets onto the next hop bearers and to indicate the GLogCh-ID newly introduced in this invention. For this, the protocol stack of each of these hops comprises in addition to the known functions of RLC, MAC and the physical layer a relaying function that carries in a header field of transmitted packets the GLogCh-ID and that decides, based on the configuration by the DgNB, on the next hop bearers onto which to multiplex the packets. This relaying function could be performed in the RLC layer as an additional function with an additional RLC header field. Alternatively, the hop-to-hop protocol stack could include an additional and enhanced PDCP layer for that function. FIG. 2a shows another alternative for the function in an additional protocol layer named Relaying Protocol (RP) without loss of generality.

Similarly, FIG. 2b shows the respective protocol stack for the transfer of user data from the UE device UE1 to the DgNB. The protocol for multiplexing of service data flows on data radio bearers (SDAP) newly introduced for 5G NR and the PDCP protocol for encryption, integrity protection and control data compression are present in UE1 and the DgNB. Again, the protocol layers below PDCP, i.e. radio link protocol (RLC), medium access control (MAC) and the physical layer (PHY) are related to an actual radio link and are therefore present in each involved node. The newly introduced relaying function with indication of the GLogCh-ID and multiplexing is again shown as the relaying protocol (RP) while alternatives exist as described above.

FIG. 2c depicts the protocol stack for the establishment and maintenance of the RRC connection between the small cell SC3.1 and the DgNB. RRC and PDCP peers are in SC3.1 and DgNB respectively, RLC, MAC and PHY are hop-by-hop. The relaying function, e.g. in the RP-layer, is only required in the second hop of that connection, i.e. SC2.1 to DgNB. A protocol stack for establishment and maintenance of an RRC connection between SC2.1 and DgNB, which is not shown in any figure, would look very similar to FIG. 2c, yet with a direct peer of every protocol stack layer between SC2.1 and DgNB.

Based on the architecture described above, one aspect of this invention is the configuration of candidate handover target small cells by the DgNB. The configuration is performed so that a UE device is enabled to autonomously switch the connection from a current source small cell to one of the candidate target small cells, based on criteria configured by the DgNB, but without reporting measurements related to the source and target cell and without being ordered by a base station to perform a handover.

The UE device is configured with a set of candidate small cells, i.e. cell identities, frequency resources and radio parameters. The configuration may comprise further information like the mode of accessing the target cell, e.g. via RACH or via direct resource request on an uplink control channel. Also, the configuration comprises criteria to switch cell, e.g. a threshold below which the current source cell has to fall before cell switching is considered, thresholds for comparing the source and target cells, a duration for which a target cell must have a reception signal strength with a threshold above the source cell or other criteria. In the event the criteria are met, the UE immediately switches to the target cell.

Above candidate list of potential target cells is very different from the well-known neighbour cell list, which comprises cells to measure and report to the serving cell under certain criteria so that the serving cell can decide to prepare handover and order the UE device to perform a handover. The legacy neighbour cell list configuration and related measurement and report configuration and performance can thus continue in parallel to this invention for potential target cells that are not under the control of the DgNB serving the UE device.

Also, the candidate list and autonomous cell switch is very different from a cell selection after radio link failure in a serving cell, as this requires the UE to go through Idle state, i.e. setup a new RRC context with the selected cell.

The configuration of candidate small cells is not only done in the UE device. The DgNB configures the candidate target small cells as well to enable data transfer via a target cell to immediately start after a cell switch.

The DgNB configures candidate target cells with all information required to transmit and receive data and to multiplex and route data (control and user data) from and to the UE device. That is, the candidate small cells are configured with MAC layer configuration comprising
Information about existing signaling and data bearers established in the UE device,
Multiplexing information for multiplexing the bearers onto transport channels or physical resources,
Priority information, e.g. priority of bearers of the same UE relative to each other, and/or priority of the UE device relative to other UE devices or small cells served by the same small cell,
Physical layer configuration comprising
A UE device identity (UE-Id), e.g. a C-RNTI as known from LTE, with which the UE can identify itself when accessing a target cell
Radio capabilities of the UE device and radio parameters
One or more Global Logical Channel Identities (GLogCh-IDs) that are to be transmitted together with data received from the UE device to allow proper multiplexing in further hops.
Routing information for transport of UL and/or DL information from or to the UE device.

The DgNB configures the above information into candidate small cells, i.e. small cells that a UE device may directly access via a radio link connection. In addition, the DgNB configures all small cells that are on the route between any of the candidate target small cells and the DgNB. These routing small cells that do not provide an air interface to the UE device, are configured with GLogCh-IDs that are used to identify data of different QoS and/or priority (i.e. of different bearers) originating from or addressed to the UE device,
Associated QoS and/or priority information, and
Routing information for transport of UL and/DL information from or to the UE device.

To summarize, all small cells potentially involved in routing of data from a UE device are configured with information required to forward data packets from or to the UE device according to the packet's individual QoS requirements. Small cells that are candidates to serve the UE device's radio link in addition, are configured in addition with a UE device identity and physical and MAC layer parameters for setup and maintenance of the radio link.

A UE switching to a target cell requests UL resources from the target cell with its UE-Id. The target cell can identify the UE based on the pre-configured UE-Id and provide available resources according to the bearer, multiplexing and priority information. The resources are requested by the UE for transmission or user data or control data, e.g. application data or RRC messages, which also serves as an indication for the target small cell base station that the UE has switched cell.

The UE device will ideally reset its RLC and MAC entity so that no further context transfer from the source small cell is required. Depending on the required QoS of the bearers, lost packets can be retransmitted on PDCP layer between UE device and DgNB. As the UE device has a security association with the DgNB, all data is encrypted and optionally integrity protected so that the target small cell does not need to perform any security setup procedures with the UE device.

In order to ensure a quick route switch within the sub-network and route DL traffic towards the new small cell, as soon as the UE device arrives in a small cell, the small cell will inform the next higher small cell about the UE now being served by that target small cell. This is repeated by all small cells up the hierarchy until a base station is reached that is part of the old as well as the new route. We may call this base station the joint base station, which is either a small cell or the DgNB. The joint base station will immediately start routing DL packets along the new route to the target small cell. The trigger for a small cell to inform the next hop small cell about a UE device arrival may be the UE providing its UE-ID in a resource request. The preferred alternative is that a first data packet, e.g. comprising an RRC message from the UE to the DgNB, arrives at the small cell. This packet, routed along the new path, indicates the path switch to be established to any small cell on its way up to the joint base station. That is, the first UL packet serves as the indication of the UE arrival for further small cells. Alternatives are that the small cells have a peer-to-peer signaling, i.e. via their backhaul MAC layer or via a new SC-to-SC protocol.

As described, one beneficial aspect of the new DgNB-centric architecture is that security takes place between UE device and DgNB so that the UE and small cells do not have to perform additional security procedures that would delay the cell switch.

One drawback of the non-existence of security associations between the UE device and any small cell is the possibility of security attacks from fraud UE devices simply accessing a small cell with a fake UE-Id or with a real UE-Id from a fraud device, injecting false data in UL and routing UE device related data towards a new small cell and potentially away from an actual small cell serving the respective UE device.

Using integrity protection will prevent data from a fraud UE device to cause any erroneous data to be successfully injected in a data stream. Also, encryption will ensure data cannot be read by the fraud UE device. However, denial-of-service attacks may still be an issue because the re-routing to the new target cell initiated by a fraud UE device will prevent data from reaching the correct target UE device.

In order to prevent this kind of attacks, the joint base station will temporarily duplicate packets in DL to both, the new and the old route. Also, it will accept UL packets from both routes to be forwarded along the single route above the joint base station. Any duplicated packets will be filtered in the DgNB using PDCP sequence numbers or integrity protection means.

Finally, the UE device itself will inform the DgNB about its switch of the serving cell in an RRC message which will be generated by the UE device, obviously with security, and when received, the DgNB is informed about the cell switch. The impacted small cells may in addition inform the DgNB via their RRC or a similar protocol about the changes that have occurred. The DgNB in return informs the impacted small cells about the switch of the route, i.e. small cells below the joint base station on the old path may be informed to stop routing to and from the UE, the joint base station is informed to stop duplicating packets and use the new path only and UE as well as small cells are informed about new candidate small cells for a potential future autonomous handover.

The joint base station may apply packet duplication only for limited time. It may start a timer which is stopped when a new route is confirmed by the DgNB. If the time expires before a confirmation is received, the DgNB may stop packet duplication and return to the old route assuming that the new route is not appropriate.

Because of the inventive autonomous cell switch described herein, the data transfer been UE and the core network is continued during the time the DgNB is not informed about the cell switch or has not informed the small cells appropriately, and data delay is kept at a minimum. This invention thus overcomes the latency introduced by multi-hop radio sub-networks.

In DL, the new route will only be used after the joint base station has got the information about the path switch. Between the switch by the UE device and first DL packets routed to the target small cell, some packets may be delivered in DL along the old route. To reduce the likelihood or the number of lost packets, the UE device, depending on its capabilities, may continue to receive packets from the source small cell until a first packet has arrived in DL in the target small cell. A reset of the RLC, MAC and PHY layer in the UE will then only take place when a first DL packet in the new cell arrives.

If the UE device uses a communication service that requires very reliable data transfer, redundant transmission of data may be beneficial to overcome packet losses. The newly introduced architecture of this invention may be advantageously used also for this case. A UE may have multiple serving small cells and a configuration of candidate target small cells for autonomous mobility. The UE may now use the mechanisms described to switch one of the small cells autonomously while keeping other redundant links unchanged. Only when UL and DL transmission via the autonomously selected target small cell is confirmed, e.g. by a first DL packet arriving or by a respective DL RRC message received from the DgNB, the redundant other links can be switched. The redundant transmission can be a bearer QoS setting used permanently for a specific bearer or it is a feature used temporarily only in conjunction with the described small cell switch to prevent packet loss.

The current invention can also be used for dual connectivity where a single UE device is connected in parallel to different base stations. The UE device may be connected to two or more small cells controlled by the same DgNB and use the autonomous switching techniques to select the best cells. The UE device may alternatively be connected to a first base station and a small cell controlled according to this invention by a DgNB, the first base station not being controlled by the DgNB. Then the autonomous switching techniques are used to select the best small cell while the first base station stays the same or is changed by legacy handover procedures.

Yet another alternative to the architecture of FIG. 1 is a UE that has two or more parallel connections to the same DgNB, one via a direct air interface and one to a small cell with wireless backhaul as described herein. The control signaling may then go via the direct link to the DgNB while the UE is configured to autonomously select the best small cell for the parallel connection. The main reason for the autonomous cell switch, overcoming the control signaling delay of measurement reporting and handover performance introduced by the multi-hop architecture of cascaded small cells, however, is not present in this use case.

Yet another use case for the current invention is the use of multiple small cells for a single UE device for multiple bearers so that an optimal small cell is selected by the UE device for different radio bearers. It may be that some small cells are optimized for some features while they provide other features only limited or not at all. An example could be small cells that are specialized for low latency applications, but that cannot offer high data rate. These small cells could broadcast their nature to allow UE devices to take the information into account when selecting new small cells, or the candidate cell configuration from the DgNB comprises special features of the small cells. The autonomous cell switch described in this invention would then be performed by the UE device for only a part of the bearers, the UE has setup or will setup. The mechanisms apply as described and the GLogCh-ID of UL packets will enable the joint base station to apply DL route adaption only for respective bearers. Also, the route confirmation received later from the DgNB will confirm a new route for some bearers of the UE device while other bearers are still routed along an old route. This use case of the present invention is especially useful for new data traffic types "ultra low latency (ULL)", "ultra reliability (URL)" and "massive internet of things (MIoT)" of the developed 5G network, that may be used for some bearers of a UE device, while other bearer may be used for usual broadband traffic. An example deployment could provide a low latency small cell base station in coverage of a UE device directly connected to the DgNB, bypassing multiple wireless backhaul hops of alternative small cell base stations in UE device coverage. The low latency small cell base station offering only limited bandwidth or only connection less data communication, while other small cell base stations offer different services over a more efficient but slower multi-hop wireless backhaul.

The mechanisms described above allow autonomous switching of the serving cell for UE devices. The new architecture as shown in FIG. 1 is based on a wireless backhaul for the involved small cell base stations. The wireless backhaul between small cells is based on the same or a similar air interface as the air interface between a UE device and a small cell. The inventive mechanisms of the current invention can thus be applied also on the wireless backhaul itself.

A small cell base station, e.g. SC3.1, being served by another small cell base station, SC2.1, may be configured with candidate small cells, e.g. SC2.2, for autonomous cell switching. The candidate small cell is prepared with routing and multiplexing information as well as radio and identity information, so that small cell SC2.2 can take over serving SC3.1 after a cell switch. The mechanisms described above can all be used accordingly, e.g. route switching, packet duplication and final route manifestation by the DgNB via Layer 3 signaling. A GLogCh-ID would only be configured for bearers originating from the small cell SC3.1 itself, as bearers routed by SC3.1 originating from other devices, e.g. UE1 and UE2, are already associated with a GLogCh-ID. Assuming a small cell does not generate any user data, only signaling radio bearers for setup and maintenance of the RRC connection between SC3.1 and DgNB would be identified with GLogCh-IDs and associated with QoS and/or priority information in the candidate small cell SC2.2.

This application of the current invention to the wireless backhaul connection allows a flexible dynamic backhaul setup. However, because small cells are assumed not to be mobile, the number of candidate small cells for automatic cell switch in this case is assumed to be much lower than that of (usually mobile) UE devices. The switching option may be a counter measure against dynamic shadowing effects between two small cells or against outage of small cells. Mobile small cells, however, may profit from the described network architecture and mechanisms similar to UE devices.

The preparation of a candidate small cell to serve as wireless backhaul for another small cell after autonomous cell switching requires that the candidate small cell is informed about all current and potential future bearers served or routed by the source small cell. That is, if a wireless backhaul network is bigger and has a deeper hierarchy than the example network of FIG. 1 and a small cell routing traffic of several tens of other small cell each with a number of UE devices, the configuration information for preparation of each small cells for autonomous switching will grow large. The configuration and its update will consume a lot of bandwidth of the wireless network and compute resource in the DgNB and small cells.

An alternative may then be to have an identical full configuration of all small cells of a wireless backhaul, i.e. every small cell is configured with the full information of served bearers and devices, e.g. all GLogCh-IDs and related priorities and QoS. The configuration information can then be broadcasted from the DgNB, i.e. a full configuration is provided once by the DgNB to all small cells directly connected to the DgNB and the small cells after reception of the configuration information, store and apply the configuration and forward the information to all further small cells that are served with a direct link. The same mechanism could apply to configuration updates that only comprise changes of the full configuration stored. The broadcast mechanism would require a common security key for integrity protection to be available in all involved small cells to ensure correctness of the configuration information. The security can be achieved either with a symmetric key provided via dedicated layer 3 signaling from the DgNB to each small cell or with an asymmetric key pair of the DgNB the public key of which is pre-configured or included in the broadcast as a certificate verifiable by the receiving small cells.

The described broadcast prepares every small cell as a candidate for cell switching of all devices, UEs and small cells. A candidate configuration in the switching devices with candidate small cells will ensure that switching is still limited under DgNB control. Also, it would be possible to use multicast, i.e. a broadcast of different configuration messages addressed to a group of small cells. This would reduce the single configuration messages in bigger hop-to-hop wireless backhaul subnetworks.

It should be noted that the description of the current invention does not prevent the wireless backhaul connection of small cell base station to be secured, e.g. with a secure tunnel like an IPSec tunnel, to prevent eavesdropping and data manipulation at that level. This option is not further described in this invention as is does not impact the inventive steps and benefits of the current invention, it is simply an implementation option.

Figure 3:
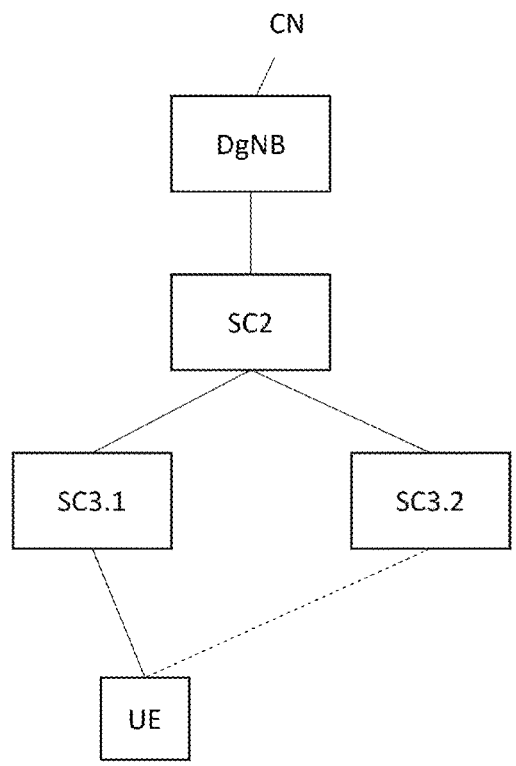
FIG. 3 is a schematic illustration of a sub-network.

FIG. 3 shows a simplified architecture comprising a DgNB, three small cell base stations SC2, SC3.1 and SC3.) and a UE device UE. The UE device has an access link to small cell base station SC3.1. The small cells SC3.1 and SC3.2) have wireless backhaul links to small cell base station SC2 which has a wireless backhaul link to DgNB. The DgNB is connected to the core network of an operator network.

Figure 4:
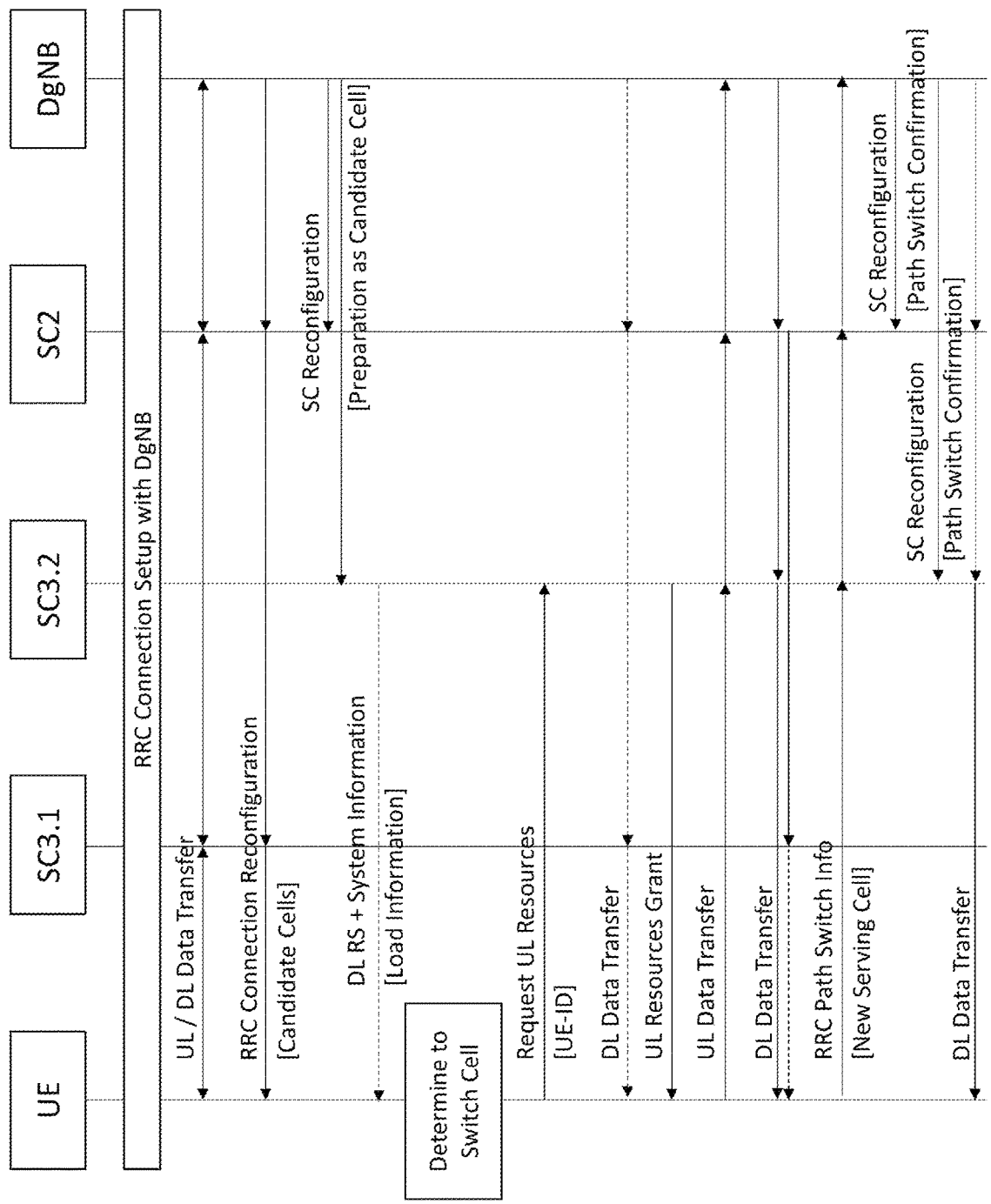
FIG. 4 is a message sequence chart

FIG. 4 shows in a message sequence chart a message and data exchange within the subnetwork depicted in FIG. 3. As a prerequisite and shown as a single box without details it is assumed that according to the base architecture of this invention all small cell base stations and the UE device have an RRC connection with the DgNB.

In the initial state of FIG. 4, the UE has ongoing uplink UL and downlink DL data transfer. For that purpose, small cells SC3.1 and SC2 are configured according to this invention so that they can provide QoS to the data bearers the UE has currently setup. The UE device has a UE device identity, e.g. a C-RNTI according to the LTE standard, allocated which the UE device uses in UL transmissions to indicate the originator of the data. This may be done by scrambling UL messages with the UE device identity or by transmitting the plain identity or parts thereof as part of the data. The UE device identity is also used by the serving small cell for DL data transmissions to address resources used to transmit the data to the UE device. Again, scrambling or other techniques may be used to carry the UE device identity or parts thereof in the DL resource allocation. According to the present invention, small cell base station SC3.1 is configured with the C-RNTI of the UE device. The UE device may in addition be provided small cell specific resources in time and/or frequency domain for requesting UL scheduling from the small cell base station SC3.1. Other radio parameters concerning the radio features supported or preferred by the UE device may also be configured similar to known radio standards as LTE or 5G NR.

The UE may have three signaling radio bearers and four data radio bearers, in sum seven radio bearers with relevant QoS parameters as listen in Table 1. The respective information is configured in the UE device and in the small cell base station that currently serves the UE device SC3.1.

TABLE 1

| LogCh-ID | RB-Type | Relative Priority | GLogCh-ID |
|---|---|---|---|
| 1 | SRB0 | 1 | 65 |
| 2 | SRB1 | 1 | 66 |
| 3 | SRB2 | 4 | 67 |
| 4 | DRB1 Best effort | 6 | 68 |
| 5 | DRB2 SIP Signaling | 3 | 69 |
| 6 | DRB3 VoIP | 2 | 70 |
| 7 | DRB4 Video Streaming | 5 | 71 |

Small cell base station SC3.1 has a wireless backhaul link to small cell base station SC2 which may have eight radio bearers configured, three signaling radio bearers to setup and maintain its own RRC connection to the DgNB and five data radio bearers for forwarding or relaying data with different QoS. Table 2 shows in an exemplary manner the wireless backhaul bearers configured for SC3.1 in SC3.1 and SC2. Only the three signaling radio bearers originating from SC3.1 are allocated a Global Logical Channel Identity as all forwarded or relayed data are expected to already comprise a GLogCh-ID according to their originating device and bearer.

TABLE 2

| LogCh-ID | RB-Type | Relative Priority | GLogCh-ID |
|---|---|---|---|
| 1 | SRB0 | 1 | 101 |
| 2 | SRB1 | 1 | 102 |
| 3 | SRB2 | 4 | 103 |
| 4 | DRB1 Best effort | 6 | — |
| 5 | DRB2 SIP Signaling | 3 | — |
| 6 | DRB3 VoIP | 2 | — |
| 7 | DRB4 Video Streaming | 5 | — |
| 8 | DRB5 Conversational Video | 2 | — |

Similarly, for small cell SC3.2 information may be configured in SC3.2 and SC2 according to Table 3:

TABLE 3

| LogCh-ID | RB-Type | Relative Priority | GLogCh-ID |
|---|---|---|---|
| 1 | SRB0 | 1 | 104 |
| 2 | SRB1 | 1 | 105 |
| 3 | SRB2 | 4 | 106 |
| 4 | DRB1 Best effort | 6 | — |
| 5 | DRB2 SIP Signaling | 3 | — |
| 6 | DRB3 VoIP | 2 | — |
| 7 | DRB4 Video Streaming | 5 | — |
| 8 | DRB5 Conversational Video | 2 | — |

Small cell base station SC2 is configured according to this invention with information of devices that are or may potentially be served by SC2, e.g. GLogCh-ID, QoS and priority information, the information may differ from that configured in the served devices. For example, priority information in small cell base station SC2 may take into account that high priority signaling radio bearers of the small cell base station SC2 itself have a higher priority than similar bearers forwarded or relayed by SC2. Also, high priority signaling radio bearers of small cell base stations served by SC2, e.g. SC3.1 and SC3.2, may have higher priority than signaling radio bearers of UE devices. Thus, an example of data relating to the UE device UE and small cell base stations SC3.1 and SC3.2 configured by the DgNB into SC2 is shown in Table 4. In addition, small cell base station SC2 is configured with its own signaling and data radio bearers similar to base stations SC3.1 and SC3.2 in Tables 2 and 3.

TABLE 4

| GLogCh-ID | Relative Priority | RB-Type | Routing |
|---|---|---|---|
| 65 | 3 | High Prio Signaling | SC3.1 |
| 66 | 3 | High Prio Signaling | SC3.1 |
| 67 | 6 | Low Prio Signaling | SC3.1 |
| 68 | 8 | Best Effort | SC3.1 |
| 69 | 5 | SIP Signaling | SC3.1 |
| 70 | 4 | VoIP | SC3.1 |
| 71 | 7 | Video Streaming | SC3.1 |
| 101 | 2 | High Prio Signaling | |
| 102 | 2 | High Prio Signaling | |
| 103 | 5 | Low Prio Signaling | |
| 104 | 2 | High Prio Signaling | |
| 105 | 2 | High Prio Signaling | |
| 106 | 5 | Low Prio Signaling | |

According to this invention, small cell base station SC3.1 receives data from the UE device (UE) via any of the radio bearers. Assuming user data packets arriving from all data radio bearers, i.e. DRB1, DRB2, DRB3 and DRB4. Small cell base station SC3.1 receives the packets, decodes and de-multiplexes them and re-assembles segmented packets into original user data packets. In most cases, these are IP-packets from respective applications. In other examples where packets are received from signaling radio bearers SRB0, SRB1 or SRB2, the packets may not be IP-packets but RRC messages from the RRC layer of the UE device UE. Now, SC3.1 determines for each user data packet based on the radio bearer from which the packet was received and based on the configuration by the DgNB a Global Logical Channel Identifier GLogCh-ID and appends it to the data packet before forwarding the packet via the wireless backhaul to the small cell base station SC2. That is, for packets received from the UE device UE on data radio bearer DRB1 a GLogCh-ID=68 is appended before forwarding the data via the wireless backhaul. For data radio bearers DRB2, DRB3 and DRB4, the GLogCh-IDs 69, 70 and 71 are appended, respectively. The appending may be done according to any suitable protocol, e.g. any of the existing protocols in the 5G NR protocol stack or a new protocol as named example wise in FIG. 2 as Relay Protocol "RP". The forwarding of the packets is done according to the configuration by the DgNB, i.e. according to the configuration data of Table 2. The table provides for each of the UE device's radio bearers a relative priority with which the data is treated with respect to the order of transmitted packets that are multiplexed onto the same resources. Higher priority, i.e. smaller integer values of the relative priority parameter, lead to a prioritized transmission while lower priority packets are only transmitted if no higher priority packets are pending transmission. Table 2 also provides for each of the UE device's radio bearers a RB-Type information, which may also be called quality of service, QoS, which indicates the nature of the services the data originates from. The RB-Type may be used by the small cell base station to select one of the five data radio bearers DRB4 to DRB8 of the small cell base station for forwarding of the data packet. The same principle is applied to data packets received in small cell base station SC3.1 from the UE device UE over one of the signaling radio bearers SRB0, SRB1 or SRB2 with respective higher priority, different QoS or RB-Type and GLogCh-ID 65, 66 or 67, respectively.

The small cell base station SC2 receiving a data packet from small cell base station SC3.1 via any of the data radio bearers DRB1, DRB2, DRB3, DRB4 or DRB5 on the wireless backhaul link of SC3.1 will decode and de-multiplex the packets, re-assemble segmented packets and determine the appended GLogCh-ID. It will look up the GLogCh-ID according to the configuration by the DgNB, e.g. the look up of an example packet from the UE device with LogCh-ID=68 leads to a forwarding by SC2 according to a quality of service "Best effort" and relative priority 8. The small cell base station SC2 does not have any information about the UE device UE nor does it need to associate the GLogCh-ID=68 to a specific device. However, it receives enough information to determine a forwarding treatment of the packet with respect to QoS and priority and by forwarding also the GLogCh-ID together with the received data packet, it provides enough information for further small cells to determine a forwarding treatment and to the DgNB to associate the packet to a specific UE device. Assuming small cell base station SC2 has setup a bearer to the DgNB that is suitable to transport best effort data, it is used, and data is multiplexed onto available resources according to priority 8.

The DgNB has the information about the mapping of GLogCh-IDs allocated in the subnetwork controlled by the DgNB to UE devices and respective radio bearers of the UE devices so that after successful reception of a packet the DgNB can determine based on the GLogCh-ID the correct PDCP and/or RRC entity to which the packet is addressed.

The above describes the UL data transfer from UE device to the DgNB via the multi-hop subnetwork. For the DL the same principles can apply, i.e. a GLogCh-ID is appended by the DgNB to any data packets transmitted to a small cell base station, e.g. SC2. The small cell base station SC2 determines the GLogCh-ID, looks up the respective QoS and priority and forwards the data packets with the LogCh-ID. In order for the small cell base station to determine the route, i.e. to which of the served devices a data packet should be routed, the DgNB has configured a routing information into small cells for devices they do not serve with an access link. In the given example, this is small cell base station SC2 and the routing configuration is depicted example wise in the "routing" column of Table 4.

In that table, all radio bearers to/from the UE device are routed via small cell base station SC3.1. The routing information may be provided in the form of a next hop address or a next hop device name, the latter being shown in Table 4. The routing information may alternatively be provided with an index of a next hop, the index pointing to a pre-configured table.

Table 4 does not comprise routing information for radio bearers of small cell base station SC3.1 and SC3.2 as both small cell base stations are served with an access link by SC2 and thus the GLogCh-ID of any packet maps to the respective radio bearer of the access link and thus to the final device.

Looking now at FIG. 4, the description above mainly explained firstly the pre-assumption of an established RRC connection of every UE device and small cell base station with the DgNB, which is shown in the figure in the top box. Secondly, the above describes the data transfer between a UE or other devices to and from the DgNB, which is shown simplified in the figure with the top-most double arrows.

According to the current invention, the DgNB configures the UE device UE with candidate cell information comprising in this embodiment information about a cell spanned by small cell base station SC3.2. The information may comprise resource information, e.g. a frequency band or a mid-frequency of the cell bandwidth of the candidate cell. The information may also comprise a cell identity, e.g. a physical cell identity encoded in the synchronization signals broadcasted in the cell to allow a cell identification on the base of the synchronization signals. The information may further comprise a UE device identity to be used by the UE device when accessing the candidate cell. In this embodiment it is assumed that the UE device identity, e.g. the C-RNTI, is not changed when switching between cells autonomously. For random access or other data limited ways of accessing a candidate cell, the UE device and the candidate cell may be configured with a short UE device identity in addition or instead of the C-RNTI.

In addition, the candidate small cell SC3.2 is configured so that it is able to serve the UE device after an autonomous cell switch of the UE device. For that purpose, SC3.2 is configured with the UE device identity, in this embodiment the C-RNTI and/or a short UE device identity, and further information needed to serve the UE. For example, UE radio capabilities related to the MAC and physical layer are configured.

In addition, the information according to Table 1 which is currently present in the UE device and in the small cell base station SC3.1 for serving the UE device, is also configured into small cell base station SC3.2. This information enables SC3.2 to multiplex DL data onto the appropriate radio bearers and forward UL data with appropriate QoS and priority and appending the correct GLogCh-ID as explained further above for small cell base station SC3.2.

Now, the small cell base station SC3.2 broadcasts synchronization and reference signals as well as system information which is received by the UE device and a measurement of the candidate cell SC3.2 is derived that is used by the UE device to decide on a potential cell switch. The information broadcasted by SC3.2 is shown as a dashed line in the figure because this is just an example and any other kind of trigger for the UE device to decide on a cell switch may be used to implement this invention. The system information may comprise load information that helps the UE device to determine whether the service that can be expected from SC3.2 is better than the service of the currently serving SC3.1.

According to this embodiment the UE device determines to switch cell autonomously and request resources from the candidate small cell base station SC3.2. This may be done by performing a random access to the candidate small cell using the short UE device identity that was configured. The UE device may request in a first random-access message resources for a longer second message sent on the granted resources. Alternatively, if no random-access is required, e.g. for timing reasons, the UE may directly use a physical uplink control channel for requesting UL resources using the C-RNTI.

During that procedure, the DL data transfer via small cell base station SC3.1 may continue. Depending on the UE device radio capabilities, the UE device may be able to successfully receive data from SC3.1 and acknowledging the reception in UL while starting the UL data transfer to SC3.2. This option is shown with dashed lines in FIG. 4.

The candidate small cell SC3.2 may reply to the UL resource request with a UL resource grant which, when received by the UE device, may change the candidate small cell SC3.2 into the new serving small cell. The UE device compiles first UL data packets, e.g. from user data packets or an UL RRC message, and transmits these to the small cell base station SC3.2. The packets are received and the mapping of configured radio bearers onto the radio bearers of the wireless backhaul link is done as described for the UL packet forwarding of small cell base station SC3.1 including the appending of the GLogCh-ID in an appropriate communication protocol.

According to the present invention, as soon as UL data packets from the UE device are received in small cell base station SC2, recognized by their LogCh-ID, the duplication of DL data packets to the UE device of the same bearer, recognized by the same LogCh-ID, is started. Duplication in this sense means that these DL packets are transmitted by the small cell base station along the old route, i.e. to small cell base station SC3.1 in this embodiment, and in addition they are copied to the new route from which the first UL packets have been received, i.e. small cell base station SC3.2.

In case the GLogCh-ID is built so that it allows identification of all bearers belonging to a single UE device, the principle of temporarily copying DL data packets in a small cell base station may be applied to all bearers of a UE once a first UL data packet has been received. In case the GLogCh-ID does not allow distinction of UEs, the DL copying can only be applied to bi-directional bearers for which UL packets have been received. In that case it may be foreseen that the UE device transmits dummy packets in UL for bearers that currently don't have UL data to send to allow for a fast usage of the new route in DL for all bearers. These dummy packets could be of zero user data length, i.e. only contain a small header, or they may otherwise be marked so that they are eliminated from the data flow within the radio access sub-network.

The reception of a first DL packet by the UE via the new small cell base station SC3.2 or the first UL grant or successful reception of an UL packet acknowledge by the new small cell base station may trigger the UE device to inform the DgNB about the successful execution of a cell switch in an RRC message, e.g. "path switch Info". The reception of this message in the DgNB may trigger the DgNB to inform all involved small cells about the path switch, i.e. small cell base station SC2 is requested to manifest the new route to the UE, small cell base station SC3.2 is requested to function as serving small cell and SC3.1 is configured to delete the UE context or it is configured as a candidate small cell for a future cell switch back to the old cell.

In case the small cell base station SC2 copied the DL packets for only a part of the bearers of the UE device, the DgNB may trigger the route manifestation now for all bearers of the UE device.

Now, DL data transfer for all bearers of the UE device takes the route to the new small cell base station. A new configuration of the UE providing new candidate small cells may be performed by the DgNB thereafter.

Figure 5:
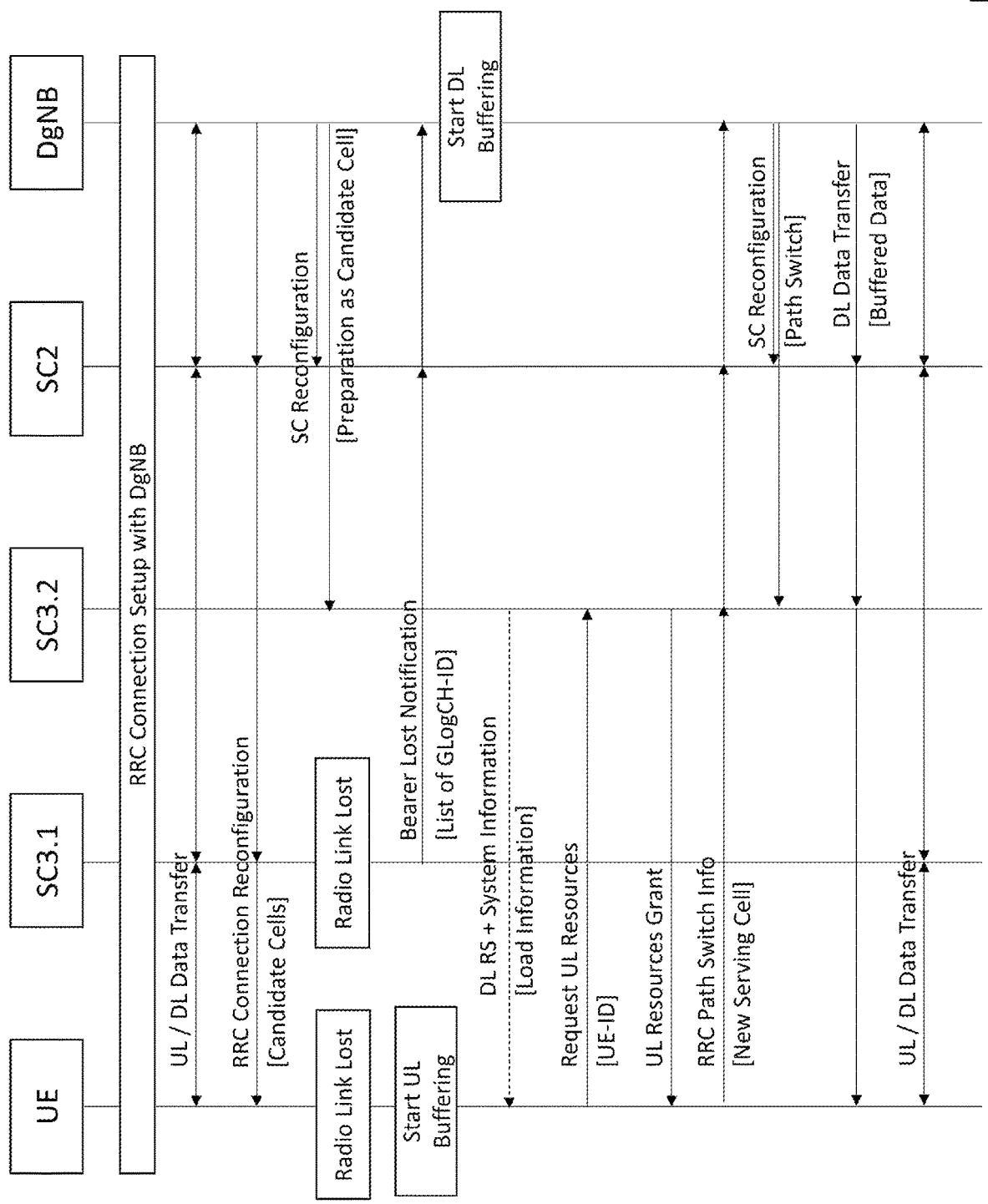
FIG. 5 is a further message sequence chart.

A variation of the previous is shown in FIG. 5 based on the same sub-network architecture of FIG. 3. The prerequisite of RRC connections of the UE device and all small cell base stations with the DgNB and the configuration of small cell base stations SC3.1 and SC2 with GLogCh-IDs and routing information is the same as in the previous embodiment.

In this embodiment, according to a new aspect of this invention, the small cell base station SC3.1 is configured to inform the DgNB if a connection to a UE device is lost. The small cell SC3.1 informs the DgNB of a loss of connection to the UE by transmitting a UE device identity or it informs of a loss of connection to served bearers by transmitting a list of GLogCh-IDs to which connection has been lost. Either of the information can be transmitted in a kind of "bearer loss notification" to the DgNB.

In FIG. 5, at a point in time, the UE device and the small cell base station SC3.1 detect loss of connection, e.g. due to a radio link failure as a result of the UE leaving the cell or a shadowing of the UE antenna or alike. The UE device will start buffering the UL data right away, as no link for transmitting is available. This is not different to state of the art UE device implementations. According to this invention, the small cell base station SC3.1 informs the DgNB about a loss of connection to the UE device and the DgNB will start buffering DL data. The DgNB may also start a timer which, when it expires, triggers an implicit release of the RRC connection to the UE device. In this embodiment, it is assumed that the timer does not expire and the RRC connection is maintained.

The UE device performs the autonomous cell switch to a candidate small cell, in this embodiment SC3.2 and transmits in the UL, preferably as a first UL packet, an RRC message informing the DgNB about the path switch. The RRC now re-configures the impacted small cells SC2, SC3.1 and SC3.2 about the new path to and from the UE device and starts transmitting the buffered DL data before the regular DL data transfer of new data is continued. The UE may start UL data transfer right after is autonomously switched cell.

Figure 6:
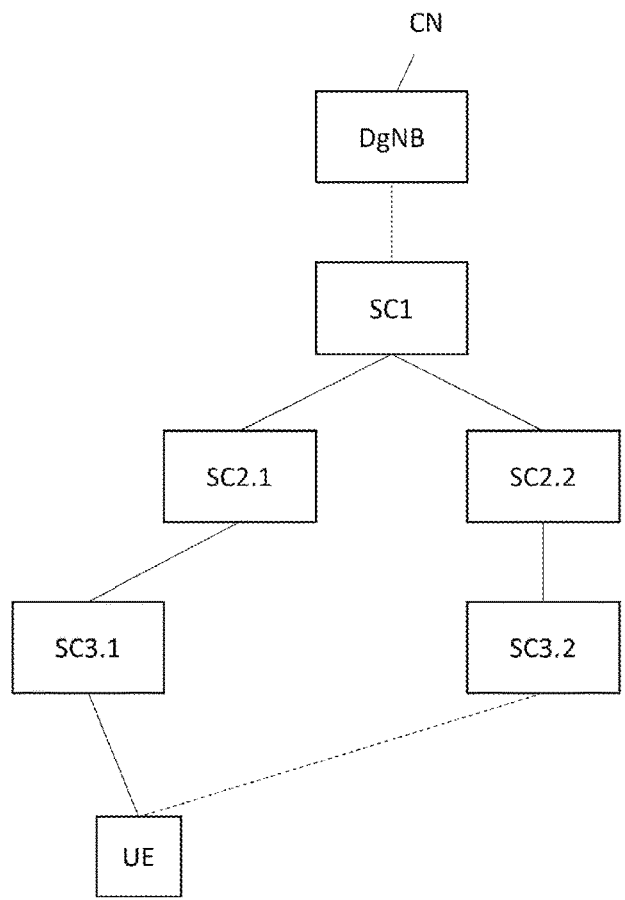
FIG. 6 is a schematic illustration of a further sub-network arrangement.

A further embodiment will now be described. This embodiment is an amendment of a part of the previous embodiments in an architecture according to FIG. 6. In comparison to the architecture of FIG. 3 the depicted sub-network has one layer of hierarchy more. This embodiment should show a useful aspect of the present invention for bigger sub-networks.

Figure 7:
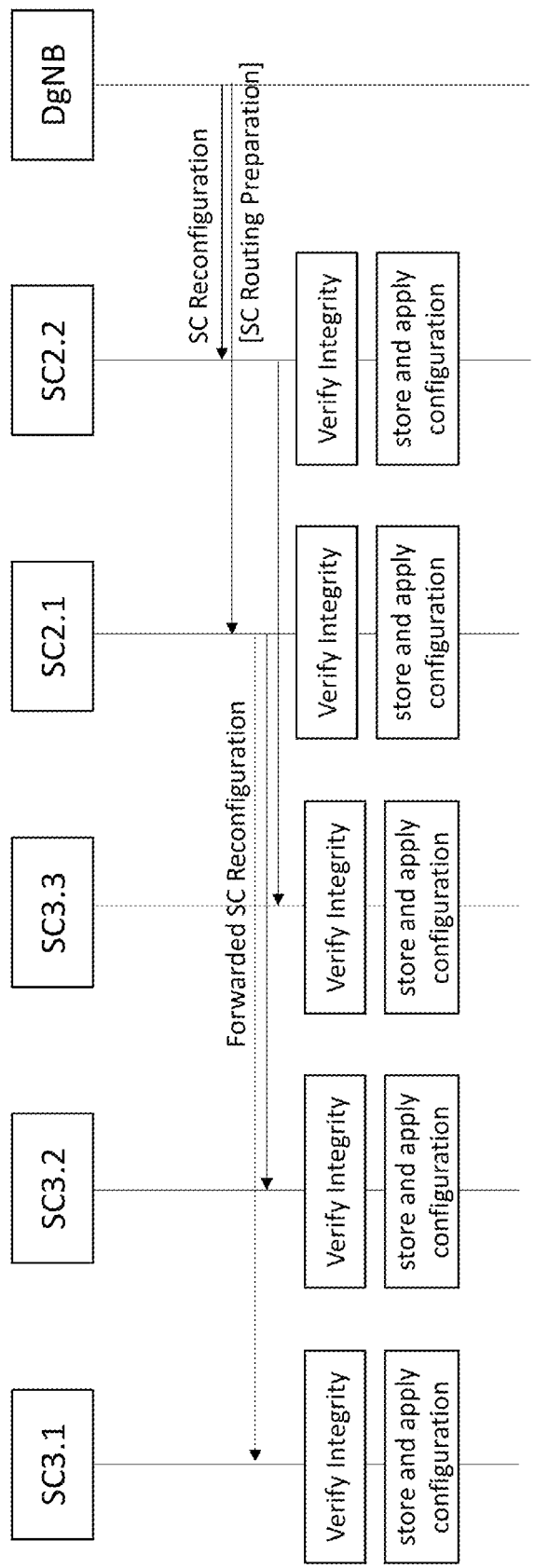
FIG. 7 is a message sequence chart.

Assuming all five small cell base stations of the sub-network are configured to actually or potentially serve the UE device, an individual configuration of the small cell base station according to the previous two embodiments consumes significant radio resources on the wireless access links. An alternative is shown in FIG. 7. The DgNB broadcasts a small cell reconfiguration message comprising the small cell routing preparation information, i.e. the GLogCh-IDs and related QoS, priority and routing information.

Broadcast in this sense means a distribution to all directly connected small cell base stations of the sub-network with the purpose to store and apply the configuration and in parallel forward the information by every small cell base station to the next small cell base stations directly connected via an access link.

According to FIG. 7, all small cell base stations receiving the reconfiguration message forward the message, verify its integrity, e.g. by verifying their integrity based on a certificate stored in each small cell base station received from the network operator beforehand. When the integrity is verified, the configuration is stored and applied.

This is an efficient distribution mechanism for the configuration of the sub-network that can be combined with the core steps of the present invention described in an exemplary manner for the first two embodiments.

Any reconfiguration of a UE device or small cell base station of the sub-network that leads to an addition, a removal or a significant reconfiguration of a signaling or data bearer will then lead to a broadcast of a small cell reconfiguration message comprising updated GLogCh-ID, priority, QoS and/or routing information, so that all small cell base stations are prepared to serve UE devices after an autonomous cell switch. If the efficient broadcast mechanism of the third embodiment is not used, any such reconfiguration of a UE device or small cell base station will lead to an individual reconfiguration of all impacted small cell base stations.

Figure 8:
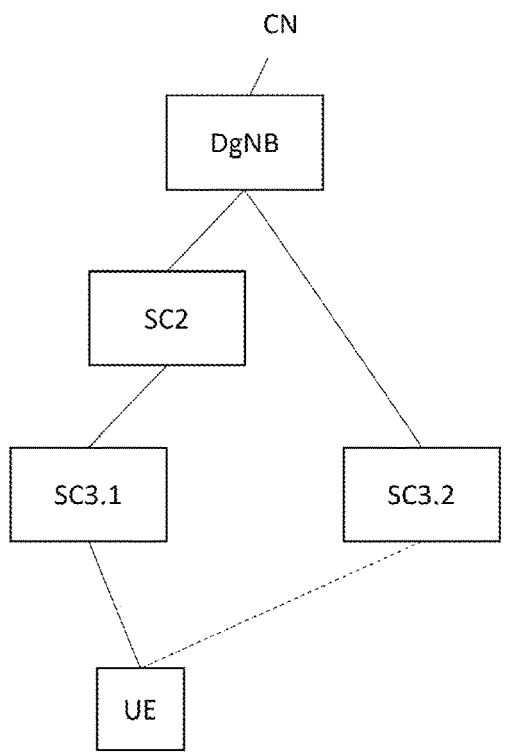
FIG. 8 is a schematic illustration of a further sub-network arrangement.

A fourth embodiment is based on an architecture depicted in FIG. 8 which is similar to the architecture of FIG. 3 except that small cell base station SC3.2 is directly connected to the DgNB. SC3.2 may be optimized for low latency and limited bandwidth communication.

The UE device may have several applications running that have a QoS that does not require low latency communication. In addition, the UE has one application that sporadically generates data packets requiring a low latency transmission (ULL data) and that usually generate a limited amount of DL traffic, e.g. a single acknowledgement on the network layer.

Figure 9:
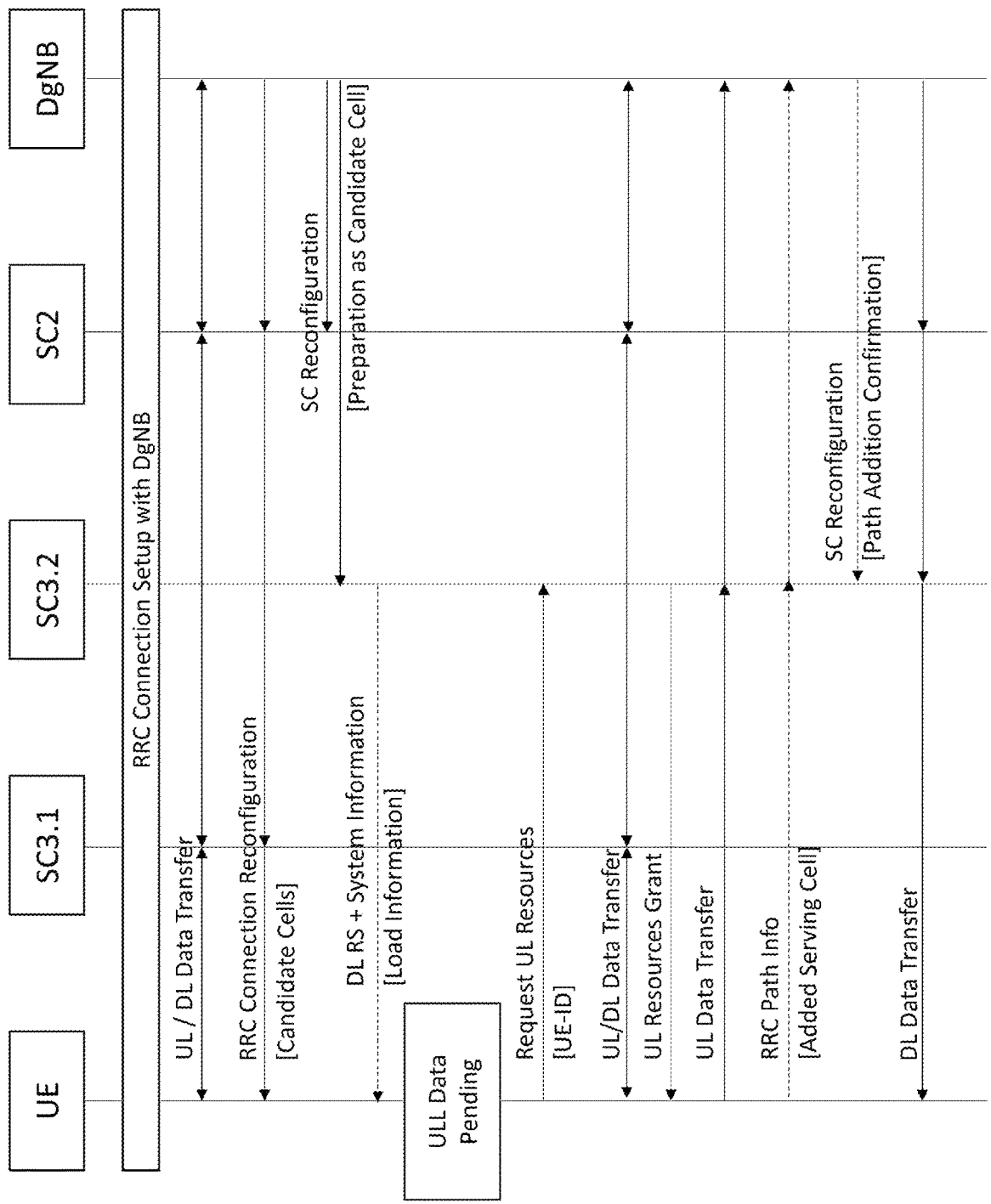
FIG. 9 is a message sequence chart for the sub-network of FIG. 8.

FIG. 9 shows a message sequence according to this embodiment. The UE device is assumed to be connected to small cell base station SC3.1 and have an RRC connection with the DgNB similar to the first embodiment The UE device is configured with at least one candidate cell SC3.2, this is a candidate for transmission of ULL data. This cell is not considered for autonomous cell switching as in the other embodiments, but it is considered for autonomous selection for ULL data transmission. The small cell base station SC3.2 is configured as a candidate cell, but the configuration may be limited to supporting the ULL data radio bearers, e.g. a single GLogCh-ID and no signaling radio bearers of the UE device.

At a point, ULL data is generated by the respective application, the UE device selects the candidate cell SC3.2 for transmission and requests UL transmission resources while UL and DL transmission via the small cell base station SC3.1 continues for other applications, i.e. other radio bearers, or for RRC signaling. After a grant the UE device transmits the ULL data in UL which is routed according to the small cell configuration to the DgNB. The resulting DL data is routed the same routed and received from SC3.2 in the UE device. Optionally, the UE device may inform the DgNB about the data transmission on the newly selected small cell base station SC3.2 and the DgNB may reconfigure the small cell base station and confirm the new path. This is described here as optional and shown in FIG. 9 with dashed lines as for a single data transmission, any involvement of the DgNB beyond the data routing may be omitted.

Particular aspects of the invention may be summarized as follows.

A base station controlling a radio access subnetwork, the radio access subnetwork comprising at least one UE device and multiple cascaded small cell base stations, the at least one UE device and multiple cascaded small cell base stations having an RRC connection to the base station,
  the multiple cascaded small cell base stations further comprising
    multiple small cell base stations each having a wireless backhaul link to another small cell base station,
    at least one small cell base station having a wireless backhaul link to the base station
    multiple small cell base stations each having a wireless access link to other small cell base stations,
    at least one small cell base station having a wireless access link to the at least one UE device,
  the base station
    configuring the UE device with candidate small cell information, the candidate small cell information comprising identification information of at least one candidate small cell spanned by one of the multiple cascaded small cell base stations for autonomous cell switching and at least one condition for the execution of the autonomous cell switching, and
    configuring at least one small cell base station as a candidate small cell base station for having a wireless access link to the at least one UE device after an autonomous switch by the UE device, the configuring as a candidate small cell base station comprises configuration of
      a UE device identification used by the UE device when accessing the candidate small cell,
      one or more bearer identifiers identifying one or more bearers of the UE device, and
      forwarding treatment information for each of the one or more bearer identifiers, the forwarding treatment information comprising at least one of quality of service parameters, priority information and routing information for forwarding data packets from or to the UE device received by the candidate small cell base station, and
    receiving information about a cell switch executed by the UE device autonomously, (the cell switch execution not being triggered by the station).

The base station above capable of configuring, after receiving the information about a cell switch executed by the UE device autonomously, the UE device with updated candidate small cell information. Also, confirming, after receiving the information about a cell switch executed by the UE device autonomously, a path switch in small cell base stations involved in routing data from or to the UE device.

A base station controlling a radio access subnetwork, the radio access subnetwork comprising at least one UE device and multiple cascaded small cell base stations, the at least one UE device and multiple cascaded small cell base stations having an RRC connection to the base station,
  the multiple cascaded small cell base stations further comprising
    multiple small cell base stations having a wireless backhaul link to another small cell base station,
    at least one small cell base station having a wireless backhaul link to the base station multiple small cell base stations having a wireless access link to other small cell base stations, and at least one small cell base station having a wireless access link to the at least one UE device, the base station configuring the UE device with candidate small cell information, the candidate small cell information comprising identification information of at least one candidate small cell spanned by one of the multiple cascaded small cell base stations for autonomous cell switching and at least one condition for the execution of the autonomous cell switching, and configuring at least one small cell base station for routing data of one of the at least one UE devices, the configuring comprises configuration of one or more bearer identifiers identifying one or more bearers of the UE device, and forwarding treatment information for each of the one or more bearer identifiers, the forwarding treatment information comprising at least one of quality of service parameters and priority information, routing information for routing downlink data packets received on the wireless backhaul link to the UE device, the routing information comprising at least one first path for routing downlink data packets to the UE device, and at least one alternative path for routing downlink data packets to the UE device after an autonomous cell switch by the UE device, and in response to receiving information via one of the at least one alternative paths about a cell switch executed by the UE device autonomously, confirming a path switch to the small cell base station.

The base station as above, wherein the confirming a path switch to the small cell base station comprises requesting to terminate duplication of data packets to the first path.

The base station as above, wherein configuring at least one small cell base station for routing data of one of the at least one UE devices comprises providing identical configuration information to all small cell base stations having an access link to the base station for configuration of the small cell base stations and for forwarding the configuration information by the small cell base stations to further small cell base stations, the configuration information being integrity protected so that small cell base stations can verify the integrity of the configuration data.

A UE device for executing autonomous cell switching, the UE device having a wireless access link to a first small cell base station, having an RRC Connection to a macro base station controlling the first small cell base station and the UE device, receiving from the macro base station a UE device identification information and candidate small cell information, the candidate small cell information comprising identification information of at least one candidate small cell, and at least one condition for the execution of an autonomous cell switching, wherein the UE device, based on measurements of signals received from a candidate small cell and the at least one condition for the execution of the autonomous cell switching, determines autonomously to execute a cell switch to the candidate small cell and requests uplink resources for data transmission from the candidate small cell using the UE device identification information.

The UE device as above which autonomously determines to execute a cell switch without receiving a message triggering the cell switch to the candidate small cell and without informing the first small cell base station about the cell switch execution. Also, a UE device as above which executes the cell switch while data transfer to and/or from the first small cell base station is ongoing.

The UE device may be arranged such that after successful execution of the cell switch it informs the base station in an RRC message sent via the switched-to small cell about the execution of the cell switch, wherein the execution of the cell switch is deemed successful after receiving from the switched-to small cell one of an uplink resource grant and a downlink data packet.

After receiving from the base station neighbour cell measurement information, the neighbour cell measurement information comprising identification information of at least one cell not controlled by the base station, and while (or in parallel to, but actually never really simultaneously) measuring received signals of candidate small cells from the identification information of at least one candidate small cell to determine whether to execute an autonomous cell switch, the UE device may perform neighbour cell measurements according to the neighbour cell measurement information.

The UE device may report neighbour cell measurements to the macro base station according to the neighbour cell measurement information independent of the autonomous cell switch.

A small cell base station controlled by a base station having a wireless backhaul link to another small cell base station controlled by the base station, the small cell base station receiving from the macro base station UE device information, the UE device information comprising a UE device identifier identifying a UE device not currently served by the small cell base station, one or more radio bearer identifiers uniquely identifying (within a subnetwork controlled by the base station) one or more radio bearers of the identified UE device, and forwarding treatment information associated with the one or more radio bearer identifiers, the forwarding treatment information comprising at least one of quality of service information, priority information and routing information, receiving from the UE device a request for uplink resources, the request comprising a UE device identifier, identifying the UE device based on the respective UE device identifiers received from the UE device and from the macro base station, granting uplink resources to the identified UE device without further communication relating to the UE device with the macro base station, and receiving an uplink data packet on a radio bearer from the UE device, determining the radio bearer identifier uniquely identifying the radio bearer of the UE device and forwarding the data packet together with the determined radio bearer identifier to the another small cell base station via the wireless backhaul link according to the forwarding treatment information.

A small cell base station controlled by a base station having a wireless backhaul link (to another base station) and having wireless access links to at least two further small cell base stations controlled by the base station, the small cell base station receiving from the base station
- one or more bearer identifiers each identifying one or more bearers of a specific UE device, and
- forwarding treatment information associated with the one or more identified bearers, the forwarding treatment information comprising at least one of quality of service information and priority information,
- routing information for routing downlink data packets received on the wireless backhaul link to the specific UE device, the routing information comprising at least a first and a second path for routing downlink data packets to the specific UE device, the small cell base station, while transmitting all downlink data packets identified by a bearer identifier to be routed to the specific UE device along the first path contained in the routing information, in response to receiving at least one uplink data packet from the specific UE device on (an access link of) the second path contained in the routing information, starting to transmit all downlink data packets identified by a bearer identifier to be routed to the specific UE device along the second path.

The small cell base station may be arranged such that starting to transmit all downlink data packets identified by a bearer identifier to be routed to the specific UE device along the second path comprises transmitting a copy of all downlink data packets identified by a bearer identifier to be routed to the specific UE device in addition along the first path contained in the routing information, and
- the small cell base station stopping to transmit a copy of all downlink data packets identified by a bearer identifier to be routed to the specific UE device along the first path contained in the routing information after receiving a confirmation message from the macro base station via the wireless backhaul link, the confirmation message confirming the path switch.

The invention claimed is:

1. A method of operating a first small cell base station in a mobile communication system sub-network comprising a macrocell base station and a plurality of small cell base stations including the first small cell base station in which the plurality of small cell base stations are in wireless communication with the macrocell base station, wherein the first small cell base station has either a direct connection to the macrocell base station or has a connection to the macrocell base station via one or more other small cell base stations, the method comprising:
- receiving at the first small cell base station from the macrocell base station small cell base station configuration information,
- receiving at the first small cell base station data from a user equipment (UE) device previously having a connection to a second small cell base station, and
- using the small cell base station configuration information to forward the received data to the macrocell base station either directly or via the one or more other small cell base stations,
- wherein the first small cell base station determines that the UE device has autonomously switched its connection to the first small cell base station from the second small cell base station by determining that the UE device has transmitted one of a resource request to the first small cell base station comprising an identity of the UE device and a first data packet to the first small cell base station, and
- wherein the first small cell base station upon determining that the UE device has autonomously switched its connection to the first small cell base station from the second small cell base station informs a next higher small cell base station between the first small cell base station and the macrocell base station, or if no such next higher small cell base station is present the macrocell base station, about the UE device being served by the first small cell base station to enable a routing of downlink packets destined for the UE device to the first small cell base station.

2. The method according to claim 1, wherein the first small cell base station determines that the UE device has autonomously switched its connection to the first small cell base station from the second small cell base station by determining that the UE device has transmitted a first data packet to the first small cell base station, the first data packet comprising a radio resource control message generated by the UE device which has the macrocell base station as a destination.

3. The method according to claim 1, wherein the first small cell base station determines that the UE device has autonomously switched its connection to the first small cell base station from the second small cell base station by determining that the UE device has transmitted a first data packet to the first small cell base station, the first data packet comprising a locally unique identifier identifying a radio bearer of the UE device which has been provided to the first small cell base station in the small cell base station configuration information.

4. The method according to claim 1, wherein the first small cell base station is further configured such that when the first small cell base station is providing wireless backhaul links for a third small cell base station and a fourth small cell base station and a second UE device determines to switch cell autonomously from the third small cell base station to the fourth small cell base station, the first small cell base station on receiving a locally unique identifier associated with the second UE device from the fourth small cell base station starts routing downlink data packets to the fourth small cell base station based on the small cell base station configuration information.

5. The method according to claim 4, wherein the starting routing of downlink data packets to the fourth small cell base station comprises sending duplicate downlink data packets to the third and fourth small cell base stations until the first small cell base station is informed about a path switch by the macrocell base station.

6. A first small cell base station in a mobile communication system sub-network comprising a macrocell base station and a plurality of small cell base stations including the first small cell base station in which the plurality of small cell base stations are in wireless communication with the macrocell base station and wherein the first small cell base station has either a direct connection to the macrocell base station or has a connection to the macrocell base station via one or more other small cell base stations, the first small cell base station being configured to:
- receive from the macrocell base station small cell base station configuration information,
- receive data from a user equipment (UE) device previously having a connection to a second small cell base station, and
- use the small cell base station configuration information to forward the received data to the macrocell base station either directly or via the one or more other small cell base stations,
- wherein the first small cell base station is further configured to determine that the UE device has autonomously switched its connection to the first small cell base station from the second small cell base station by determining that the UE device has transmitted one of a resource request to the first small cell base station comprising an identity of the UE device and a first data packet to the first small cell base station, and wherein the first small cell base station is configured upon determining that the UE device has autonomously switched its connection to the first small cell base station from the second small cell base station to inform a next higher small cell base station between the first small cell base station and the macrocell base station, or if no such next higher small cell base station is present the macrocell base station, about the UE device being served by the first small cell base station to enable a routing of downlink packets destined for the UE device to the first small cell base station.

7. The first small cell base station according to claim 6, wherein the first small cell base station is configured such that it determines that the UE device has autonomously switched its connection to the first small cell base station from the second small cell base station by determining that the UE device has transmitted a first data packet to the first small cell base station, the first data packet comprising a radio resource control message generated by the UE device which has the macrocell base station as a destination.

8. The first small cell base station according to claim 6, wherein the first small cell base station is configured such that it determines that the UE device has autonomously switched its connection to the first small cell base station from the second small cell base station by determining that the UE device has transmitted a first data packet to the first small cell base station, the first data packet comprising a locally unique identifier identifying a radio bearer of the UE device which has been provided to the first small cell base station in the small cell base station configuration information.

9. The first small cell base station according to claim 6, wherein the first small cell base station is further configured such that when the first small cell base station is providing wireless backhaul links for a third small cell base station and a fourth small cell base station and a second UE device determines to switch cell autonomously from the third small cell base station to the fourth small cell base station, the first small cell base station is configured such that on receiving a locally unique identifier associated with the second UE device from the fourth small cell base station the first small cell base station starts routing downlink data packets to the fourth small cell base station based on the small cell base station configuration information.

10. The first small cell base station according to claim 9, wherein the starting routing of downlink data packets to the fourth small cell base station comprises sending duplicate downlink data packets to the third and fourth small cell base stations until the first small cell base station is informed about a path switch by the macrocell base station.

11. A macrocell base station in a mobile communication system sub-network which sub-network comprises the macrocell base station and a plurality of small cell base stations, the plurality of small cell base stations being in wireless communication with the macrocell base station, wherein each small cell base station is either in direct connection with the macrocell base station or is in connection with the macrocell base station via one or more other small cell base stations, wherein the macrocell base station is arranged to configure a user equipment (UE) device having a radio resource control (RRC) connection to the macrocell base station to perform autonomous switching between small cell base stations using candidate small cell base station configuration information provided by the macrocell base station to the UE device, and wherein the macrocell base station is arranged to configure the small cell base stations with small cell base station configuration information enabling the small cell base stations to receive data from the UE device and to forward the data to either the macrocell base station or another small cell base station, wherein the macrocell base station is configured to receive from a UE device an RRC message informing the macrocell base station about an autonomous switch from a first small cell base station to a second small cell base station performed by the UE device, and to request the first small cell base station to stop routing data to or from the UE device.

\* \* \* \* \*